3,509,095
COMPOSITE POLYHYDROXY-POLYETHER RESINS AND METHOD OF MAKING SAME
Darrell D. Hicks, Louisville, Ky., assignor to Celanese Coatings Company, New York, N.Y., a corporation of Delaware
No Drawing. Continuation-in-part of application Ser. No. 281,355, May 17, 1963. This application Feb. 2, 1967, Ser. No. 613,402
Int. Cl. C08f 7/10
U.S. Cl. 260—47                                            6 Claims

ABSTRACT OF THE DISCLOSURE

Soluble, fusible, polymeric polyhydroxy polyether resins useful as protective coatings, are produced by reacting a mono(hydroxyaliphatic), monoglycidyl diether of a dihydric phenol with a different monoepoxide compound under boron trifluoride type catalysts.

CROSS REFERENCE TO RELATED APPLICATIONS

This is a continuation-in-part of my copending application, Ser. No. 281,355, filed May 17, 1963, now abandoned.

BACKGROUND OF THE INVENTION

Polyhydroxy-polyether resins are well known compositions. Such compositions are prepared by reacting epichlorohydrin and a dihydric phenol in various ratios with or without monofunctional modifiers. Such compositions and processes are described in U.S. Patents 2,456,408, 2,493,486 and 2,503,726. These compositions have structures which consist of alternating aromatic and aliphatic nuclei united through ether oxygens, the aromatic nuclei being the residue of the dihydric phenol and the aliphatic nuclei being a glyceryl residue $$-CH_2-CH-CH_2-$$
$$\phantom{-CH_2-}|$$
$$\phantom{-CH_2-}OH$$

The end groups are either phenolic or epoxy groups depending upon the ratio of the initial reactants. When monofunctional modifiers are used, such as phenol, ethylene chlorohydrin or propylene oxide, these modifiers become the end groups of the polymer. They are not interspersed throughout the polymer chain. In other words, they are not internal modifiers. Compositions that contain internal modification are described in U.S. Patent 3,033,820. These products are prepared by dehydrohalogenating chlorohydrin ethers of hydroxyaliphatic ethers of dihydric phenols.

DESCRIPTION OF THE INVENTION

In copending application Ser. No. 281,356 filed May 17, 1963, the homopolymerization of diethers of dihydric phenols, the two ether substituents being mono(hydroxyaliphatic) and monoglycidyl ether groups, is fully described. In that application, the reaction contemplated involves the reaction of an epoxide group of the glycidyl ether portion with the hydroxyl group of the hydroxyaliphatic portion. A high molecular weight polyhydroxy-polyether resin results. The invention contemplated herein concerns the production of polyhydroxy-polyether resins by copolymerizing a mono(hydroxyaliphatic), monoglycidyl diether of a dihydric phenol and a monoepoxide compound. In this reaction, the monoepoxide will copolymerize with the diether and will be incorporated into the polymer chain. This reaction is a heterogeneous polymerization wherein the monoepoxide compound will be incorporated in the polymer chain with the diether. However, as well as being incorporated within the polymeric chain structure, the monoepoxide can also terminate the chain. In either event, a polyhydroxy-polyether resin results since the reaction of an epoxide group with a hydroxyl group results in the formation of an ether group and another hydroxyl group. Incorporation in the polymer chain of monoepoxides containing no more than one hydroxyl group, imparts modifications in the resins of such properties as solubility and melting point. The flexibility, hardness, adhesion and other physical properties of the cured resins are also improved and enhanced by such modifications.

The mono(hydroxyaliphatic), monoglycidyl diethers of dihydric phenols from which these polyhydroxy-polyether resins are prepared are made by a two-step process involving first preparing the mono(hydroxyaliphatic) ether of a dihydric phenol and then reacting this compound with epichlorohydrin. Such compositions are fully described in application Ser. No. 260,040 filed Feb. 20, 1963.

The mono-hydroxyaliphatic) ethers of dihydric phenols can be readily prepared by reacting one mol of a dihydric phenol with one mol of a simple or substituted aliphatic chlorohydrin using sodium hydroxide as the condensing or dehydrohalogenating agent; or by reacting one mol of a dihydric phenol with one mol of a simple or substituted aliphatic cyclocarbonate using potassium carbonate as the catalyst; or by reacting one mol of a dihydric phenol with one mol of a simple or substituted monoepoxide. These mono-hydroxyaliphatic) ethers of dihydric phenols can be represented by the formula $$HOROR'OH$$

wherein R is the aromatic residue of a dihydric phenol and R' is a divalent radical containing at least two carbon atoms selected from the group consisting of aliphatic hydrocarbon groups, aromatic hydrocarbon substituted aliphatic hydrocarbon groups and hydrocarbon ether substituted aliphatic hydrocarbon groups.

Examples of mono(hydroxyaliphatic) ethers of dihydric phenols are the mono(hydroxyethyl) ether of p,p'-dihydroxy diphenyl dimethyl methane (Bisphenol A), in which R is the aromatic residue of Bisphenol A and R' is the —$CH_2CH_2$— group, and the mono(hydroxypropyl) ether of resorcinol, wherein R is the aromatic residue of resorcinol and R' is the

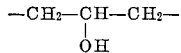

group. These groups are representative of aliphatic hydrocarbon groups.

Other mono(hydroxyaliphatic) ethers ars those prepared by reatcing one mol of a dihydric phenol with one mol of styrene oxide. Here the hydrocarbon substituted aliphatic hydrocarbon group is

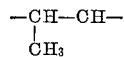

The reaction of phenyl glycidyl ether and a dihydric phenol produces a hydrocarbon ether substituted aliphatic hydrocarbon group,

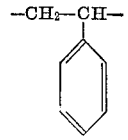

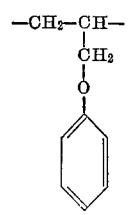

Other simple or substituted hydroxyaliphatic derivatives can be produced by varying the monoepoxide, cyclic carbonate, or chlorohydrin.

The dihydric phenols used to prepare these mono(hydroxyaliphatic) derivatives are those which have been used heretofore in preparing epoxide resins. Such dihydric phenols include resorcinol, hydroquinone, p,p'-dihydroxy diphenyl dimethyl methane, dihydroxy diphenyl sulfone, dihydroxybenzophenone and the like.

The diethers used in this invention are prepared by reacting the above described mono(hydroxyaliphatic) ethers of dihydric phenols with excess epichlorohydrin using sodium or potassium hydroxide equivalent to the phenolic hydroxyl content of the starting material. In this reaction, epichlorohydrin reacts with the phenolic hydroxyl group leaving the aliphatic hydroxyl group unreacted. This reaction is illustrated by the following equation, in which R and R' have the same meaning as hereinbefore defined:

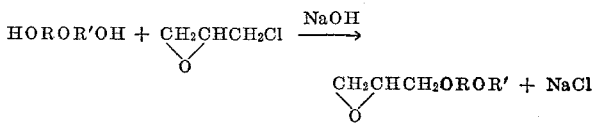

Such diethers can be the mono(hydroxy ethyl), monoglycidyl diether of Bisphenol A, the mono(hydroxypropyl), monoglycidyl diether of resorcinol, the mono(hydroxybutyl), monoglycidyl diether of hydroquinone, etc.

As indicated hereinbefore, comonomers with which this invention is concerned are epoxy compounds having only one epoxide group and not more than one hydroxyl group. Such epoxy compounds can be represented by the general formula:

wherein R'' is a monovalent radical selected from the group consisting of hydrogen, hydrocarbon groups, hydrocarbon ether groups, hydrocarbon ester groups, hydroxyl substituted hydrocarbon groups, hydroxyl substituted hydrocarbon ether groups and hydroxyl substituted hydrocarbon ester groups. The amount of comonomer usually will depend upon the properties which are desired in the polyhydroxy-polyether resins. Generally, however, the mono(hydroxyaliphatic) diether is polymerized with from 5 to 40 weight percent, based on the diether, of the comonomer. Among the comonomers suitable for polymerization with the diether are such monoepoxides as substituted alkyl compounds, as well as ethers and esters. Examples are oxirane, or ethylene oxide, as well as saturated alkyl oxiranes, for instance, methyl oxirane, or propylene oxide, butene-2-oxide, etc. Among others are esters and ethers containing only one three-membered epoxide substituent, each free of reactive groups other than hydroxyl groups. Included are phenyl glycidyl ether, isopropyl glycidyl ether, butyl glycidyl ether, glycidyl benzoate, glycidyl acetate, 1,2 and 2,3-butylene oxide, styrene oxide, limonene monoxide, etc. Hydroxyl substituted monoepoxides within the contemplation of this invention include ethers such as monoglycidyl ethers of such dihydric alcohols as propanediol, butanediol, hexanediol and the like. Also included are hydroxy substituted oxirane compounds, for instance glycidol, 1,2-epoxy butanol-4, 2,3-epoxy pentanol-5, 3,4-epoxy decanol-8, etc.

The copolymerization reaction of the aforedescribed diether with the monoepoxide is accomplished by subjecting the monomers to reaction with a condensation catalyst, particularly a boron trifluoride catalyst such as a boron trifluoride-ether complex. Preferred condensation catalysts for this reaction are the Lewis acids. Such catalysts are $BF_3$ and $BF_3$ complexes, such as the $BF_3$ ether complex, as well as $AlCl_3$, $SnCl_4$, $TiCl_4$, etc. Other acids, such as sulfuric acid, can also be used. The preferred catalyst is $BF_3$, preferably the $BF_3$ etherate.

The polymerization of the monoglycidyl, mono(hydroxyaliphatic) diether of a dihydric phenol with a monoepoxide, can be conducted at temperatures of 20° C. to 150° C. or even to 200° C. The upper temperature limit will, of course, be governed by the boiling point of the solvent used in the system. The preferred temperature range is 70° C. to 120° C. When temperatures below 60° C. are used, the rate of reaction is slow and long processing times are required. When temperatures above 120° C. are used, side reactions occur with resulting darkening of the reaction product.

The polyhydroxy-polyether resins of this invention can be prepared by bulk polymerization of the mono(hydroxyaliphatic) monoglycidyl diether and the monoepoxide, wherein no solvent is used in the reaction. However, due to the exothermic nature of this polymerization reaction and the high melting resin that is produced, the reaction is preferably conducted in a solvent. Preferred solvents are polar solvents such as ketones, ethers and esters that contain no groups reactive with epoxide groups, such as hydroxyl groups. Such solvents include methyl ethyl ketone, methyl isobutyl ketone, Cellosolve acetate, diethyl Carbitol, and the like. These solvents can also be used in admixture with aromatic hydrocarbons wherein the major portion of the solvent mixture is the polar component.

This invention will be further illustrated by the following specific examples, but it will be understood that the invention is not limited thereto. The parts in these examples is understood to be parts by weight.

EXAMPLE 1

To a suitable reactor equipped with a stirrer, condenser and thermometer are added 1368 parts of Bisphenol A, 552 parts of ethylene carbonate and 12 parts of potassium carbonate. Heat is applied and stirring is begun. Carbon dioxide begins to evolve from the reactants at a temperature of 158° C. The temperature is gradually raised to 200° C. over a half-hour period and is held at 200° C. for one and one-half hours, at which time no further reaction is occurring as evidenced by no evolution of carbon dioxide. The product is essentially the mono(hydroxyethyl) ether of Bisphenol A.

To 1635 parts of the mono(hydroxyethyl) ether of Bisphenol A are added 3000 parts of epichlorohydrin. When solution is obtained and at 70° C., 246 parts of sodium hydroxide are added in six equal increments, allowing each portion to react completely between additions. After all the sodium hydroxide has reacted, the reactor is fitted for distillation. Epichlorohydrin is distilled off to a pot temperature of 150° C. Vacuum (20 to 25 mm. Hg pressure) is applied to ensure complete removal of the unreacted epichlorohydrin. The flask contents are cooled to 120° C. and 1000 parts of methyl isobutyl ketone are added. When solution is obtained, 1000 parts of water are added. After slowly stirring for ten minutes, agitation is stopped and the organic and aqueous layers are allowed to separate. The water layer, containing dissolved salt, is drawn off and 1000 parts of fresh water are added. To the reactor are added 40 parts of sodium hydroxide and the reactor contents are heated to reflux (93° C. to 94° C.) and are held at reflux for one hour. The water layer is then drawn off and 1000 parts of fresh water are added. The mixture is neutralized with 30 percent phosphoric acid, and the water layer is drawn off. The remaining water is removed by azeotropic distillation with the methyl isobutyl ketone. When all the water is removed, the solution is filtered and the solvents are removed by vacuum distillation (20 to 25 mm. Hg pressure) to a pot temperature of 150° C. The resulting monoglycidyl, mono(hydroxyethyl) diether of Bisphenol A has an epoxide equivalent weight of 359 and an active chlorine content of 0.04 percent.

To a 500 milliliter flask equipped with stirrer, thermometer, reflux condenser and inlet tube are added 37 parts of Cellosolve acetate and 1 part of $BF_3$ etherate. Heat is applied and at 65° C., 71.6 parts of the mono(hydroxyethyl), monoglycidyl diether of Bisphenol A and 28.4 parts of butyl glycidyl ether dissolved in 30 parts of Cellosolve acetate, are added to the flask over a one-hour period. The solution, after the addition is complete, is very viscous. Hence, an additional 33 parts of Cellosolve acetate are added. The temperature is raised to 100° C. and held at 100° C. for one hour. The solution is then heated for one hour at 80° C. to 85° C. with 10 parts of cation exchange resin to remove the BF$_3$ catalyst. After filtering, the solution has a Gardner-Holdt viscosity of F-G at 51.7 percent solids.

Films prepared from this solution and 25 percent on a solids basis of butylated urea-formaldehyde resin with 0.1 percent by weight of the morpholine salt of butyl acid phosphate are cured by baking at 150° C. Well cured films with good mar resistance, hardness, flexibility, and adhesion are obtained.

EXAMPLE 2

To a 500-milliliter flask equipped as in Example 1 are added 50 parts of Cellosolve acetate and 1 part of BF$_3$ etherate. At 65° C., 73.9 parts of the monoglycidyl, mono(hydroxyethyl) diether of Bisphenol A and 26.1 parts of propylene oxide in 50 parts of Cellosolve acetate are added slowly over a period of one hour, holding the temperature at 65° C. The temperature is raised to 100° C., and held at 100° C. for one hour. The BF$_3$ catalyst is removed by treatment with cation exchange resin as previously described. The resin solution had a viscosity of B-C at 49.3 percent solids.

Films are prepared from this solution and 35 to 40 percent on a solids basis of butylated urea-formaldehyde resin with 0.1 percent by weight of the morpholine salt of butyl acid phosphate, and are cured by baking at 150° C. Films with good mar resistance, hardness, flexibility and adhesion are obtained.

EXAMPLE 3

To a 500 milliliter flask equipped as described in Example 1 are added 30 parts of methyl isobutyl ketone and 1 part of BF$_3$ etherate. Heat is applied and at 50° C., slow addition of 81.6 parts of the mono(hydroxyethyl), monoglycidyl ether of Bisphenol A and 18.4 parts of glycidol dissolved in 37 parts of methyl isobutyl ketone is begun. This monomer solution is added over a two-hour period holding the temperature between 50° C. and 55° C. Then 33 parts of methyl isobutyl ketone are added to reduce the viscosity. The temperature is raised to 100° C. and is held at 100° C. for one hour. The BF$_3$ catalyst is removed by treatment with 10 parts of cation exchange resin as previously described. The polymer solution has a Gardner-Holdt viscosity of K-L at 53.8 percent solids.

Films prepared from this solution and 25 percent on a solids basis of butylated urea-formaldehyde resin with 0.1 percent by weight of the morpholine salt of butyl acid phosphate are cured by baking at 150° C. Well cured films with good mar resistance, hardness, flexibility and adhesion are obtained.

EXAMPLE 4

Using the same equipment and procedure as described in the preceding examples, 64.8 parts of the mono(hydroxyethyl), monoglycidyl diether of Bisphenol A, and 30.2 parts of glycidyl methacrylate in 67 parts of methyl isobutyl ketone are reacted with 0.3 part of BF$_3$ etherate. The resulting solution has a Gardner-Holdt viscosity of O-P at 63.8 percent solids.

Well cured films with good mar resistance, adhesion, flexibility and hardness are obtained from this solution blended with 25 percent on a solids basis of butylated urea-formaldehyde resin and cured as described in the preceding examples.

In a similar manner, other monoglycidyl, mono(hydroxyaliphatic) diethers of dihydric phenols and other monoepoxides containing no more than one hydroxyl group can be copolymerized and cured.

The products which result from the copolymerization process of this invention are essentially high molecular weight polyhydric alcohols. These products are valuable compositions due to the presence of the hydroxyl groups which are reactive with many materials. Such materials are anhydrides, such as phthalic anhydride or maleic anhydride, or acids such as lauric or palmitic. Particularly valuable products are obtained by reacting these high molecular weight polyhydric alcohols with unsaturated acids derived from drying oils. Such esterified products are useful in preparing air-drying and baking varnishes and enamels for use as protective coatings for wood, metal and other substances. Protective coatings are also prepared by reacting these polymeric polyhydric alcohols with cross-linking agents as hereinbefore described. These cross-linking agents can be polyisocyanates, such as tolylene diisocyanate, hexamethylene diisocyanate, diphenyl methane diisocyanate, etc., which are used in the range of 0.5 to 1.2 isocyanate groups per 1 hydroxyl group; condensation products containing methylol groups and obtained from the reaction of formaldehyde with urea, melamine, benzoguanamine and phenol, which are used to make up 15 percent to 50 percent of the composition with the polyhydroxy compound; and condensation products which contain methylol groups and alkoxymethylol groups, prepared from formaldehyde and urea, melamine, acetoguanamine, phenol and the like with an alcohol such as methanol, isopropanol and butanol. Polyepoxides, such as the diglycidyl ether of Bisphenol A and dicyclopentadiene dioxide, can also be used to cross-link the polyhydroxy polyether resins of this invention.

It is to be understood that the foregoing detailed description is given merely by way of illustration and that many variations may be made therein without departing from the spirit of the invention.

The embodiments of the invention in which an exclusive property or privilege is claimed are defined as follows:

1. As a soluble, fusible high molecular weight polyhydroxy polyether resin, a copolymer of
  (A) a mono(hydroxyaliphatic), monoglycidyl diether of a dihydric phenol having the general formula

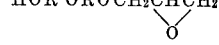

in which R is the aromatic residue of a dihydric phenol, wherein said residue contains no groups reactive with epoxy groups and R' is a divalent radical containing at least two carbon atoms selected from the group consisting of aliphatic hydrocarbon groups, aromatic hydrocarbon substituted aliphatic hydrocarbon groups and hydrocarbon ether substituted aliphatic hydrocarbon groups, wherein said radical contains no substituents reactive with epoxy groups,
  and
  (B) a different monoepoxide compound of the general formula

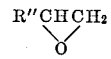

wherein R" is a monovalent radical selected from the group consisting of hydrogen, hydrocarbon groups, hydrocarbon ether groups, hydrocarbon ester groups, hydroxyl substituted hydrocarbon groups, hydroxyl substituted hydrocarbon ether groups, wherein said radical contains no substituents other than hydroxyl capable of reacting with epoxide groups,
wherein said copolymer contains 5 to 40 weight percent, based on the weight of the diether of component (B).

2. The copolymer of claim 1 wherein the diether is the mono(hydroxyethyl), monoglycidyl diether, of p,p'- dihydroxy diphenyl dimethyl methane and the monoepoxide is propylene oxide.

3. A process for producing soluble, fusible high molecular weight polyhydroxy polyether resins which comprises reacting
(A) a mono(hydroxyaliphatic), monoglycidyl diether of a dihydric phenol having the general formula

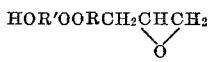

in which R is the aromatic residue of a dihydric phenol, wherein said residue contains no groups reactive with epoxy groups and R' is a divalent radical containing at least two carbon atoms selected from the group consisting of aliphatic hydrocarbon groups, aromatic hydrocarbon substituted aliphatic hydrocarbon groups and hydrocarbon ether substituted aliphatic hydrocarbon groups, wherein said radical contains no substituents reactive with epoxy groups,
and
(B) 5 to 40 weight percent, based on component (A) of a different monoepoxide compound of the general formula

wherein R" is a monovalent radical selected from the group consisting of hydrogen, hydrocarbon groups, hydrocarbon ether groups, hydrocarbon ester groups, hydroxyl substituted hydrocarbon groups, hydroxyl substituted hydrocarbon ether groups, wherein said radical contains no substituents other than hydroxyl capable of reacting with epoxide groups,
using as a catalyst a member of the group consisting of boron trifluoride, boron trifluoride complexes, aluminum chloride, stannic chloride, titanium chloride and sulfuric acid at a temperature of 20° C. to 150° C.

4. The process of claim 3 wherein the reaction is conducted in a solvent selected from the group consisting of ketones, ethers, esters and mixtures thereof, each being free of active hydrogen groups reactive with epoxide groups.

5. The process of claim 4 wherein the mono(hydroxyaliphatic) monoglycidyl diether of a dihydric phenol is the mono(hydroxypropyl) monoglycidyl diether of p,p'-dihydroxy diphenyl dimethyl methane and the different monoepoxide compound is propylene oxide.

6. The process of claim 5 wherein the solvent is methyl isobutyl ketone, the catalyst is boron trifluoride etherate and the temperature of reaction is 60° C. to 120° C.

References Cited

UNITED STATES PATENTS 3,335,191   8/1967   Brack et al. _____ 260—47

WILLIAM H. SHORT, Primary Examiner

T. PERTILLA, Assistant Examiner

U.S. Cl. X.R.

117—161; 260—2, 830, 849